United States Patent [19]

Raden et al.

[11] 4,141,862

[45] Feb. 27, 1979

[54] CATALYST COMBINATION FOR POLYURETHANES

[75] Inventors: Daniel S. Raden, Mt. Prospect; Morton A. Weiner, Waukegan; Douglas W. Hill, Fox Lake, all of Ill.

[73] Assignee: Abbott Laboratories, North Chicago, Ill.

[21] Appl. No.: 844,675

[22] Filed: Oct. 25, 1977

Related U.S. Application Data

[62] Division of Ser. No. 667,238, Mar. 15, 1976.

[51] Int. Cl.$^2$ ............................................. C08J 9/00
[52] U.S. Cl. .................................. 521/129; 521/118; 521/167; 521/170
[58] Field of Search ................................. 260/2.5 AC

[56] References Cited

U.S. PATENT DOCUMENTS

| | | | |
|---|---|---|---|
| 3,928,256 | 12/1975 | Cenker | 260/2.5 AC |
| 4,029,610 | 6/1977 | Narayan | 260/2.5 AC |

*Primary Examiner*—Lewis T. Jacobs
*Attorney, Agent, or Firm*—Paul D. Burgauer; Robert L. Niblack

[57] ABSTRACT

An excellent catalyst for polyurethane foams is a combination of 1, 3, 5-tris(3-dimethyl-aminopropyl)-s-hexahydrotriazine and 2-(dimethylamino)-ethanol. It has unexpectedly been found that this catalyst combination produces both excellent gelation and blowing reactions.

7 Claims, No Drawings

CATALYST COMBINATION FOR POLYURETHANES

This is a division, of application Ser. No. 667,238 filed Mar. 15, 1976.

DETAILED DESCRIPTION OF THE INVENTION

This invention is directed to the field of catalysts for polyurethane foams, and more particularly, to an improved catalyst system useful in all types, rigid, semi-rigid and flexible polyurethane foams.

Polyurethanes having a wide variety of properties can be prepared by making the proper choice of co-reactants from among many commercially available isocyanates, polyols, blowing agents and catalysts. Depending on the type of polyurethane properties desired, the necessary and selected ingredients can be reacted in a so-called "one-shot" system, or a pre-polymer may be formed first which is subsequently reacted with the remaining components. In either case, there are essentially three reactions that take place: chain extension or gelatin, cross-linking and blowing. Each of these reactions uses certain catalysts that promote such reactions, and depending on the choice of catalysts, one of these reactions may be favored or suppressed.

Numerous catalysts have been suggested and have found wide acceptance in the urethane industry for either one or all of the above reactions. A favored catalyst for gelation is an organic tin compound; blowing action and cross-linking are promoted by the use of amine catalysts, primarily tertiary amines. Since the above mentioned tin catalysts are quite costly, the industry has been searching for other catalysts that will aid in the promotion of the gelation reaction. One of these catalysts that has been found to contribute to gelation as well as blowing or cross-linking is the 1,3,5-tris(3-dimethylaminopropyl)-s-hexahydrotriazine, while the tertiary amine, dimethylaminoethanol has widely been used as a catalyst for the promotion of the blowing reaction.

It has now been found that against expectation, a combination of the above described triazine catalyst and dimethylaminoethanol promotes far more gelation than would be expected from either component alone. It accomplishes this without significant loss of the blowing effect of the catalyst.

The present invention is therefore directed to a new catalyst combination for the manufacture of polyurethane foams which comprises between 10 and 90 parts of 1,3,5-tris(3-dimethyl-aminopropyl)-s-hexahydrotriazine and between 90 and 10 parts of 2-(dimethylamino)-ethanol and to the process of making polyurethane foams using such a combination catalyst. A preferred range of the above catalyst combination consists of 60 to 80 parts by weight of the triazine catalyst and 40 to 20 parts by weight of the dimethylaminoethanol. The combination catalyst is preferably used in an amount of between 0.05 to 5.0 parts by weight per 100 parts by weight of the polyol used in the mixture from which the desired polyurethane foam is made; a preferred range is between 0.05 and 1.0% by weight of said catalyst combination. The above triazine catalyst has been described in U.S. Pat. No. 2,993,870.

The new catalyst mixture is miscible with water. It has a very low odor level and can be used for any type of polyurethane foam desired.

In a preferred embodiment, the above catalyst mixture is used in a one-shot system together with the selected polyisocyanate, polyol, a tin catalyst, water and a surfactant. Of course, this system may also include fillers, coloring agents, flame retardants and the like as well known by those skilled in the art.

The polyisocyanates include monomeric organic polyisocyanates, the reaction products obtained by combining an excess of monomeric or polymeric polyisocyanates with a polyol, or more complex polymeric isocyanates. Illustrative examples include tolylene-2,4-diisocyanate, 1,1-bis(4-isocyanatophenyl)-cyclohexane, diphenylether-2,4,4'-triisocyanate, 4,4'-bis(isocyanatophenylmethane) and any reaction products of an excess of a diisocyanate with a polyhydric alcohol.

The polyol component which reacts with the isocyanate may suitably be a hydroxyl containing polyester or polyether having a wide range of hydroxyl numbers. For flexible foams, the hydroxyl number is normally 25 to 60, while for rigid foams, hydroxyl numbers of 350 to 700 are used. For semi-rigid foams, a hydroxyl number in the polyol is chosen in the intermediate range, depending on the flexibility desired.

Blowing agents, which may be used in the process of the present invention include water, which reacts with the isocyanate group forming $CO_2$, inert, low boiling liquids which vaporize under the influence of the exothermic polymerization reaction such as halogenated hydrocarbons, and the like, as well known to those skilled in the art.

The reaction mixture may also contain surface active agents which serve to assist homogenisation of the ingredients and, in some cases, regulate the cell structure of the foamed product. Suitable agents include siloxane-oxyalkylene copolymers, oxyethylated fatty alcohols and other block polymers of ethylene and propylene oxides. Fillers that are suitable, where desired, include barium sulfate, chalk, asbestos, silica, calcium silicate, alumina, polyvinyl chloride, polyvinylidene chloride and fibrous materials such as polyamides, polyesters, acrylics and the like.

The selected ingredients may be mixed together in any convenient manner that will insure rapid and uniform blending of the materials. Thus, the ingredients may be mixed in batchwise or continuous manner using conventional dispensing or spraying equipment. The various components may be delivered separately to the mixing device, or, alternatively, previously prepared mixtures of mutually inert ingredients may be used so as to reduce the number of component streams required to be mixed in the final stage. It is convenient to use a two stream system, in which one stream comprises the polyol and the catalyst, while the other stream comprises the organic polyisocyanate. When water is used as a blowing agent, it can be included with the polyol; inert volatile blowing agents may be included with either the polyol mixture or the polyisocyanate. Other agents may be used, for example surface active agents and flame-proofing agents may be incorporated in the polyol mixture or in the polyisocyanate if unreactive therewith.

As mentioned above, the novel catalyst mixture is not expected to be a strong promoter of the gelation reaction, as the dimethylaminoethanol does not contribute significantly thereto. However, amine catalysts are routinely used in conjunction with tin catalysts which are represented by a large class of well-known organic tin compounds. The use of the novel amine catalyst mixture enables the formulator to substantially reduce the amount of such a tin compound in the catalyst system, thereby reducing the overall cost for catalysts to an appreciable degree.

The invention will be illustrated further with respect to the following specific examples, which are given by way of illustration and not as limitations of the scope of the invention.

EXAMPLE 1

Rate Constants

To determine the effect on the various competing reactions which take place during the preparation of a urethane foam, the above triazine (hereinafter referred to as THTR) and a combination thereof with dimethylaminoethanol (DMAE) was used, at various concentrations (expressed in percentage by weight based on the isocyanate used).

In a first experiment, activity of catalysts in the blowing reaction was compared by combining phenyl isocyanate and water in a molar ratio of 2:1 in acetonitrile at 40° C. The rate constants were also compared with that of triethylene diamine (TED), a widely used industrial urethane catalyst. The results are expressed below as rate per minute:

| Amount of Catalyst | 1% | 2% | 3% |
|---|---|---|---|
| a) TED | 0.0221 | 0.0676 | 0.0761 |
| b) THTR | 0.0315 | 0.0840 | 0.1356 |
| c) THTR/DMAE 80:20 | 0.0309 | 0.0744 | 0.1163 |
| d) Difference c) vs. b) | −2% | −9% | −14% |
| e) Difference c) vs. a) | +40% | +10% | +53% |

This comparison shows that with small catalyst amounts, the blowing effect of the new catalyst only slightly decreases over the reaction with THTR alone and is still significantly superior to that of TED.

In a second experiment, the gelation reaction activity of the new catalyst was determined by combining the above isocyanate with an equimolar amount of n-propanol in the same manner as shown above.

| Amount of Catalyst | 1% | 2% | 3% |
|---|---|---|---|
| a) TED | 0.0919 | 0.1511 | 0.2021 |
| b) THTR | 0.0772 | 0.1167 | 0.1834 |
| c) THTR/DMAE 80:20 | 0.0967 | 0.1750 | 0.2629 |
| d) Difference c) vs. b) | +25% | +50% | +43% |
| e) Difference c) vs. a) | +5% | +15% | +30% |

This comparison shows that highly significant gelation activity increases are observed between THTR and the new THTR/DMAE mixture. As noted, the new catalyst mixture is also quite an improvement over standard TED.

EXAMPLE 2

The following mixture was processed into a rigid foam with the help of the new catalyst: 100g of a phosphorous and nitrogen containing polyol, having a hydroxyl number of 494 (marketed by BASF-Wyandotte as Pluracol ® 383), 1g of a silicone surfactant (marketed by Dow Corning as DC-193), 45g of trichlorofluoromethane, 2.3g of the catalyst mixture used in Example 1, and 123.9g of a polymeric polyisocyanate having an average functionality of about 2.6 and an isocyanate equivalent weight of 134 (marketed as Mondur ® MR by Mobay Chemical Co.). The polyol, surfactant, fluorocarbon and catalyst were mixed at 1800 rpm for 5 sec. At this point (time: 0 seconds), the isocyanate was added while stirring continued for about 10 sec. more, at which time the homogeneous mixture was poured into an 83 oz. paper tub. Cream time was 18 sec. and rise time was 157 sec., at which time the stable, rigid urethane foam was also tack-free.

EXAMPLES 3-6

In these Examples, a polyoxypropylene triol with an average molecular weight of 3000 (sold as Voranol ® 3000 by the Dow Chemical Co.), a tin catalyst, a polydimethylsiloxane polyalkylene oxide copolymer (a surfactant sold as L-540 by Union Carbide), the new amine catalyst mixture, and water were mixed in the proportions shown below for 5 sec. at 2500 rpm. After adding a mixture of 2,4- and 2,6-toluene diisocyanate 80:20 (marketed as Hylene ® TM by E. I. DuPont de Nemours), the mixture was again stirred 5 sec. at 2500 rpm and poured into a rigid container. In all instances, white flexible foams were obtained at cream and rise times shown below:

| Example Number | 3 | 4 | 5 | 6 |
|---|---|---|---|---|
| Polyol | 100g | 100g | 100g | 100g |
| Water | 4.3g | 3.5g | 4.0g | 4.0g |
| Surfactant | 1.1g | 1.25g | 1.1g | 1.1g |
| Stannous Octoacte | 0.23g | 0.3g | 0.3g | 0.3g |
| Isocyanate | 54.1g | 44.7g | 50.7g | 50.7g |
| THTR + DMAE | 0.2g | 0.3g | 0.05g | 0.05g |
| Ratio THTR-DMAE | 9:1 | 2:1 | 3:2 | 2:3 |
| Cream Time in Sec. | 16 | 12 | 17 | 17 |
| Rise Time in Sec. | 114 | 163 | 113 | 119 |

EXAMPLES 7-9

The following formulations were processed on a high-shear spiral, 5-component, low pressure laboratory machine to produce a soft grade (Example 7), a medium hard (Example 8) and a firm-grade (Example 9) flexible polyurethane. The polyol, surfactant and polyisocyanate used were the same as those employed in Examples 4-6. The polyol and polyisocyanate were both used at 24° C. The components used and their amounts (given in parts by weight), the process conditions as well as the physical properties obtained are listed in the following table. In all instances, the physical properties of the foams were tested in the fashion used as standards in the industry.

| | | Ex. 7 | Ex. 8 | Ex. 9 |
|---|---|---|---|---|
| Mixing Speed | rpm | 3000 | 4000 | 4000 |
| Throughput | lbs/min. | 45 | 43 | 43 |
| Polyol | pbw | 100 | 100 | 100 |
| Surfactant | pbw | 1.1 | 1.1 | 1.1 |
| THTR/DMAE 4:1 | pbw | 0.2 | 0.2 | 0.2 |
| Stannous octoate | pbw | 0.32 | 0.32 | 0.27 |
| Trichlorofluorourethane | " | 15.0 | 5.0 | — |
| Water | pbw | 3.5 | 4.0 | 4.5 |
| Isocyanate (index) | | 46(108) | 52(110) | 55.8(107) |
| Cream time | sec. | 11 | 10 | 12 |
| Rise time | sec | 158 | 100 | 72 |

-continued

|  | | Ex. 7 | Ex. 8 | Ex. 9 |
|---|---|---|---|---|
| Density | lbs/ft$^3$ | 1.18 | 1.35 | 1.39 |
| Air flow std. | ft$^3$/min. | 5.5 | 3.8 | 5.0 |
| Compression set at 50% | | 6.0 | 8.6 | 5.7 |
| Compression set at 90% | | pinch | 9.1 | 5.3 |
| Humid aged compr.set 50% | | 7.2 | 9.3 | 7.4 |
| Humid aged compr.set 97% | | pinch | 8.8 | 7.8 |
| Indentation load deflection 25% | | | 14 | 34 |
| Indentation load deflection 65% | | 27 | 69 | 64 |
| Sag factor | | 1.9 | 2.0 | 1.9 |
| Hysteresis return | % | 71 | 68 | 62 |
| Tensile strength | psi | 10.3 | 12.8 | 17.6 |
| Elongation | % | 380 | 210 | 250 |
| Tear strength | psi | 2.0 | 1.8 | 2.7 |
| Ball rebound | % | 47 | 46 | 47 |

The new catalyst system produces comparably good results in the preparation of rigid, flexible and semi-rigid foams. In all instances, the catalytic activity of the combination of THTR and DMAE produces improved or at least equivalent physical properties as if the same amount of either catalyst were used alone. As well known, the chain-extension reaction in most instances is primarily promoted by a tin catalyst. However, the new catalyst combinations of THTR and DMAE unexpectedly contributes markedly to the chain-extension reaction. As a consequence, the amount of tin catalyst components in a combination catalyst can be reduced significantly, resulting in substantial savings on the overall costs of catalyst without sacrifice in properties of the resulting foam products. In addition, the reaction rates are often greater, resulting in attaining the final foam tack-free quicker than with previously known catalysts.

We claim:

1. A process for the preparation of a polyurethane consisting essentially in reacting an organic monomeric or polymeric polyisocyanate with an organic monomeric or polymeric polyol and a blowing agent in the presence of a catalyst containing 1,3,5-tris(3-dimethylaminopropyl)-sym-hexahydrotriazine and 2-(dimethylamino)ethanol in a weight ratio of between 9:1 and 1:9, said catalyst being present in amounts of 0.05–5.0 parts by weight per 100 parts by weight of said polyol.

2. The process of claim 1 wherein said ratio is between 8:2 and 4:6.

3. The process of claim 1 wherein said catalyst mixture is used in the presence of an organic tin catalyst.

4. The process of claim 3 wherein said tin catalyst is stannous octoate.

5. The process of claim 1 wherein said blowing agent is water.

6. The process of claim 1 wherein said blowing agent is a polyhaloalkane.

7. The process of claim 6 wherein said polyhaloalkane is trichlorofluoromethane.

* * * * *